(12) United States Patent
Sando (10) Patent No.: US 9,372,506 B2
(45) Date of Patent: Jun. 21, 2016

(54) ELECTRONIC DEVICE

(71) Applicant: FUJITSU LIMITED, Kawasaki-shi, Kanagawa (JP)

(72) Inventor: Yoshiyuki Sando, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 284 days.

(21) Appl. No.: 13/905,539

(22) Filed: May 30, 2013

(65) Prior Publication Data
US 2014/0043755 A1 Feb. 13, 2014

(30) Foreign Application Priority Data

Aug. 8, 2012 (JP) ................... 2012-176380

(51) Int. Cl.
*H05K 7/02* (2006.01)
*G06F 1/16* (2006.01)
*G06F 1/18* (2006.01)

(52) U.S. Cl.
CPC .............. *G06F 1/1626* (2013.01); *G06F 1/183* (2013.01); *G06F 1/184* (2013.01)

(58) Field of Classification Search
CPC ... G06F 1/1656; G06F 1/1626; G06F 1/1635; G06F 1/1632; G06F 1/1616; G06F 1/1658; G06F 2200/1633; G06F 1/16; G06F 1/1637; G06F 1/181; G06F 1/183; G06F 1/184; G06F 1/188; G06F 1/1601; H05K 5/0221; H05K 1/0215; H05K 1/0253; H05K 1/189; H05K 2201/0116; H05K 2201/056; H05K 2201/09618; H05K 2201/09727; H05K 2201/10106; H05K 2201/10121; H05K 2201/10371; H05K 2201/10409; H05K 2201/2009; H05K 3/341; H05K 3/3447; H05K 3/363; H05K 5/0013; H05K 5/0021; H05K 5/0086; H05K 9/0049; H05K 9/0067; H05K 1/0225; H05K 5/00; H05K 5/0217; H05K 5/0243; H05K 5/0247; H05K 7/02; H05K 7/1432; H05K 13/0061; H05K 3/361
USPC ............. 361/679.01, 679.02, 679.09, 679.21, 361/679.27, 679.55–679.58; 455/575.1–575.4
See application file for complete search history.

(56) References Cited

U.S. PATENT DOCUMENTS

| | | | |
|---|---|---|---|
| 7,492,602 B2 * | 2/2009 | Kim et al. ...................... 361/752 |
| 2001/0051298 A1 * | 12/2001 | Hanafusa et al. ............. 429/162 |
| 2009/0124305 A1 * | 5/2009 | Tanimoto ............ H04M 1/0262 |
| | | | 455/575.1 |
| 2010/0072952 A1 * | 3/2010 | Nakajima ..................... 320/150 |

FOREIGN PATENT DOCUMENTS

| | | |
|---|---|---|
| JP | 59-183689 U | 12/1984 |
| JP | 61-161654 A | 7/1986 |
| JP | 2008-20865 A | 1/2008 |
| WO | 2011/084186 A1 | 7/2011 |

OTHER PUBLICATIONS

Japanese Notification of Reasons for Refusal mailed Apr. 12, 2016, issued in corresponding Japanese Patent Application No. 2012-176380, w/ partial English translation (10 pages).

* cited by examiner

*Primary Examiner* — Anthony Haughton
*Assistant Examiner* — Ingrid Wright
(74) *Attorney, Agent, or Firm* — Westerman, Hattori, Daniels & Adrian, LLP

(57) ABSTRACT

An electronic device includes: a battery; a fixing member coupled to the battery; a printed board partially fixed to the fixing member; and a housing that houses the battery, the fixing member, and the printed board, the battery being fixed to the housing.

17 Claims, 7 Drawing Sheets

ELECTRONIC DEVICE

CROSS-REFERENCE TO RELATED APPLICATION

This application is based upon and claims the benefit of priority of the prior Japanese Patent Application No. 2012-176380, filed on Aug. 8, 2012, the entire contents of which are incorporated herein by reference.

FIELD

The embodiment discussed herein is related to an electronic device.

BACKGROUND

A housing of an electronic device houses a large number of components including a printed board and a battery.

SUMMARY

According to an aspect of the embodiments, an electronic device includes: a battery; a fixing member coupled to the battery; a printed board partially fixed to the fixing member; and a housing that houses the battery, the fixing member, and the printed board, the battery being fixed to the housing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

One of a plurality of components housed in a housing may be fixed to the housing itself. For example, a printed board may be fixed using a boss provided on the housing side. When a large number of bosses for fixing the printed board are provided on the housing side, an inside area of the housing for fixing other components may be reduced.

Figure 1A:
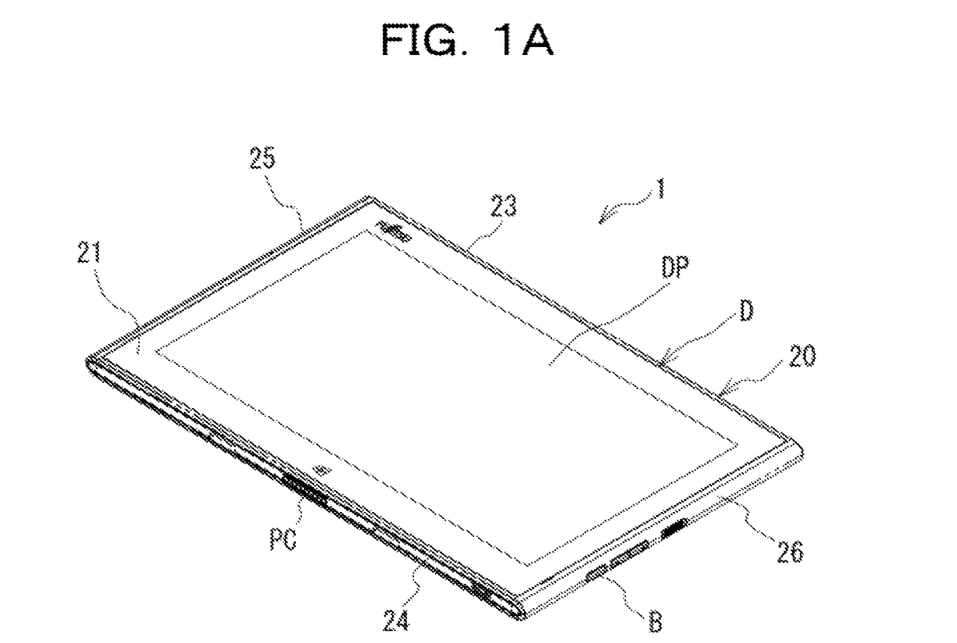
FIGS. 1A and 1B illustrate an example of an electronic device.
Figure 1B:
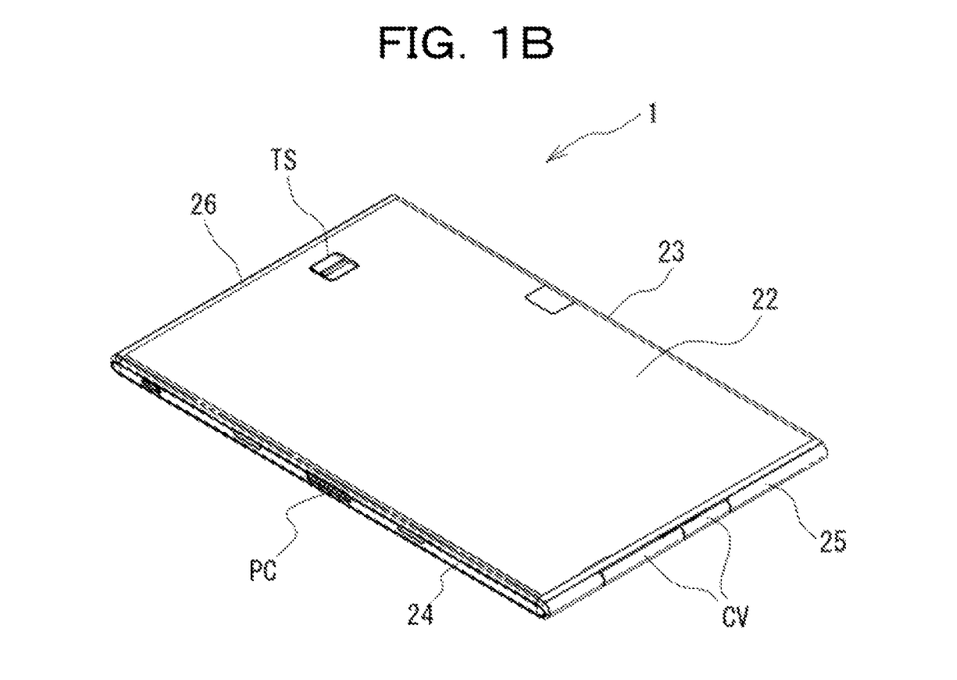

FIGS. 1A and 1B illustrate an example of an electronic device. The electronic device may be a straight computer, a tablet-type computer or similar. A computer 1 includes a housing 20. The housing 20 includes a front face 21 and a back face 22 opposite to the front face 21. The housing 20 houses a display D that displays an image. The display D includes a touch panel. The display D may be a display that has no touch panel function.

A screen DP of the display D may be exposed from the front face 21. The housing 20 may be shaped approximately rectangular and includes sides 23 to 26. The sides 23 and 24 may be opposite and parallel to each other. The sides 25 and 26 may be opposite and parallel to each other. Each of the sides 23 and 24 may be perpendicular to each of the sides 25 and 26. Each of the sides 23 and 24 may be longer than each of the sides 25 and 26. The back face 22 side may be provided with a touch sensor TS for fingerprint authentication. The side 24 may be provided with a connector PC for charging. The side 25 may be provided with a plurality of covers CV that cover connectors. The side 26 may be provided with a plurality of buttons B.

Figure 2:
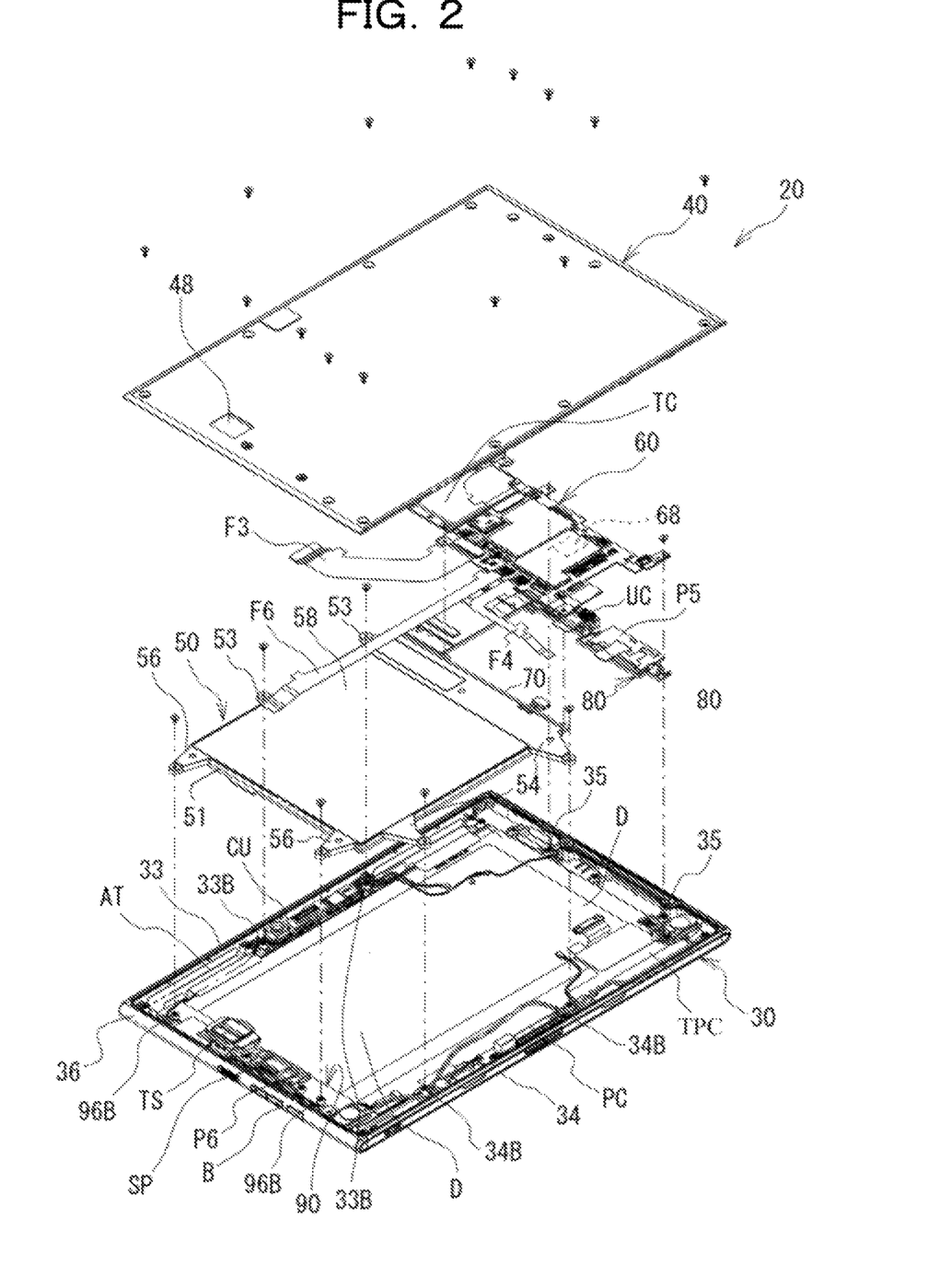
FIG. 2 illustrates an example of an exploded perspective view obtained by viewing a housing from a back face side.
Figure 3:
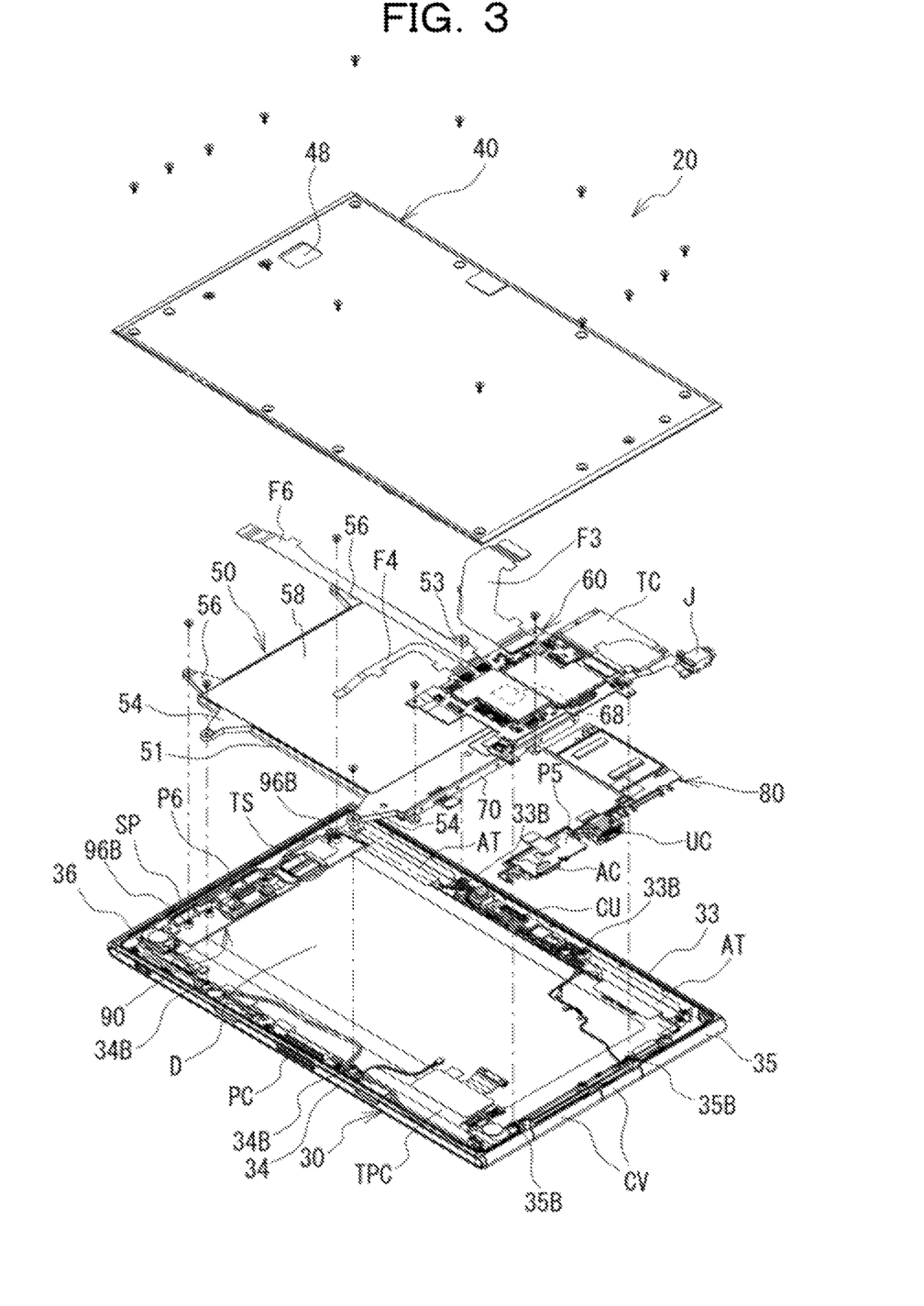
FIG. 3 illustrates an example of an exploded perspective view obtained by viewing the housing from the back face side.
Figure 4:
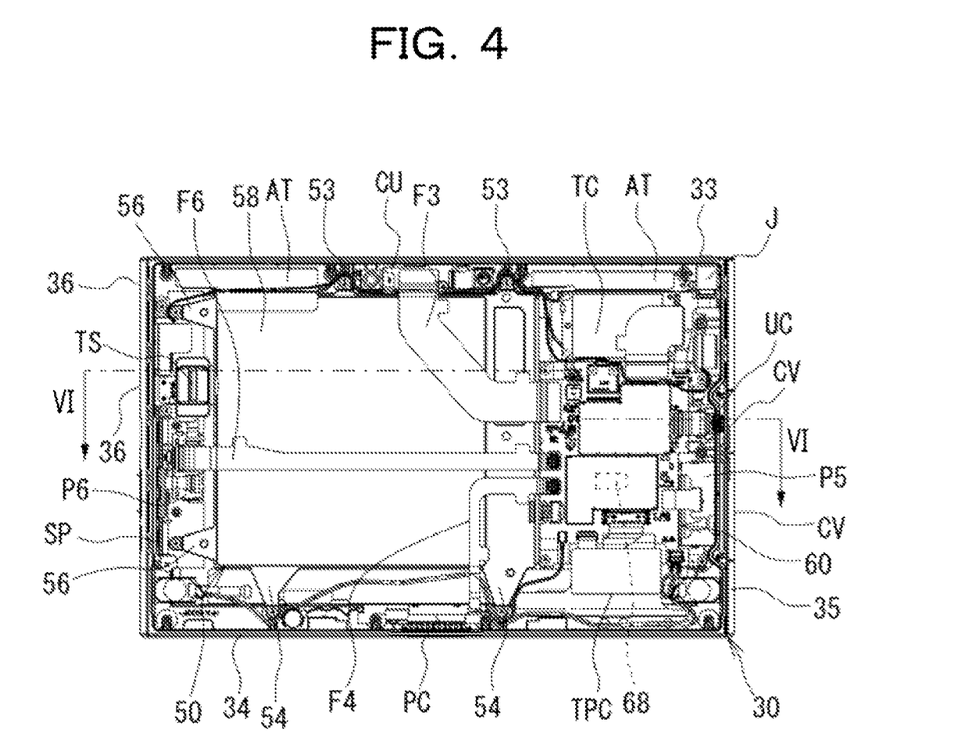
FIG. 4 illustrates an example of a rear view of a computer.

FIGS. 2 and 3 illustrate examples of an exploded perspective view obtained by viewing a housing from the back face side. The housing 20 includes a front frame 30 positioned on the front face side of the display D, and a rear panel 40 positioned on the back face side of the display D. The rear panel 40 is fixed to the front frame 30 by screws. FIG. 4 illustrates an example of a rear view of a computer. In FIG. 4, a rear view of the computer 1 from which the rear panel 40 is removed is depicted. The front frame 30 and the rear panel 40 may be made of synthetic resin. The front frame 30 is shaped like a frame covering edges of the periphery of the display D and holds the display D. The front frame 30 has edges 33 to 36. The edges 33 to 36 correspond to the sides 23 to 26, respectively.

In the housing 20, the display D, a battery 50, a motherboard 60, a fixing plate 70, support plates 80 and 90, and the like are housed. An opening 48 for exposing the touch sensor TS is formed into the rear panel 40. The battery 50 and the motherboard 60 are positioned on the back face side of the display D and held between the display D and the rear panel 40. Inside the edge 33 of the front frame 30, two antennas AT and a camera unit CU are arranged. The connector PC is fixed inside the edge 34 of the front frame 30. An earphone jack J is arranged at the corner of the edges 33 and 35 of the front frame 30. The support plate 80 is arranged on the edge 33 side and the edge 35 side of the front frame 30. The support plate 80 supports a communication card TC, a connector UC for Universal Serial Bus (USB), and a connector board P5 that mounts a connector AC.

The support plate 90 is arranged on the edge 36 side of the front frame 30. The support plate 90 is supported using bosses formed near the edge 36 of the front frame 30 and is fixed using screws. The support plate 90 supports the touch sensor TS and a relay board P6 that is electrically coupled to the touch sensor TS. Inside the edge 36 of the front frame 30, a switch board SP is arranged along the edge 36. The switch board SP mounts a switch that is switched based on an operation for a button B. The switch board SP is electrically coupled to the relay board P6.

The motherboard 60 mounts a plurality of electronic components. The plurality of electronic components include an electronic component 68 that generates heat by being supplied with electric power. The electronic component 68 may include a central processing unit (CPU) or a graphics processing unit (GPU) for example. The electronic component 68 may be a component that generates heat by being supplied with electric power, and may include a semiconductor chip, a resistor, or the like. The motherboard 60 is electrically coupled to the camera unit CU, the connector PC, and the relay board P6 via flexible printed boards F3, F4, and F6, respectively. The motherboard 60 is electrically coupled to the connectors AC and UC, and the earphone jack J. The motherboard 60 is electrically coupled to the touch panel of the display D via a flexible printed board TPC. The motherboard 60 controls the entire computer 1.

The battery 50 is electrically coupled to the motherboard 60 via a connector. The battery 50 supplies electric power to the electronic components mounted on the motherboard 60, the display D, and the like. The battery 50 includes a frame-shaped frame 51 and a battery body held in the frame 51. The frame 51 may be made of synthetic resin. An upper portion of the frame 51 is covered by a sheet 58. A plurality of projecting parts 53, 54, and 56 project from the periphery of the frame 51. A screw hole is formed into each of the projecting parts 53, 54, and 56. Bosses 34B provided with screw holes are formed on the edge 34 side of the front frame 30. The projecting parts 54 of the battery 50 are supported using the bosses 34B and fixed by screws. Bosses 33B provided with screw holes are formed on the edge 33 side of the front frame 30. The projecting parts 53 of the battery 50 are supported using the bosses 33B and fixed by screws. Both of the bosses 33B and 34B may be formed in a space between the display D and the edges 33 and 34. Bosses 96B provided with screw holes are formed in the support plate 90. The projecting parts 56 of the battery 50 are supported using the bosses 96B and fixed by screws. The battery 50 may be partially fixed directly to the front frame 30 and may be partially fixed to the support plate 90. The support plate 90 is fixed to the front frame 30 using bosses that are formed on the edge 36 side and provided with screw holes.

Figure 5:
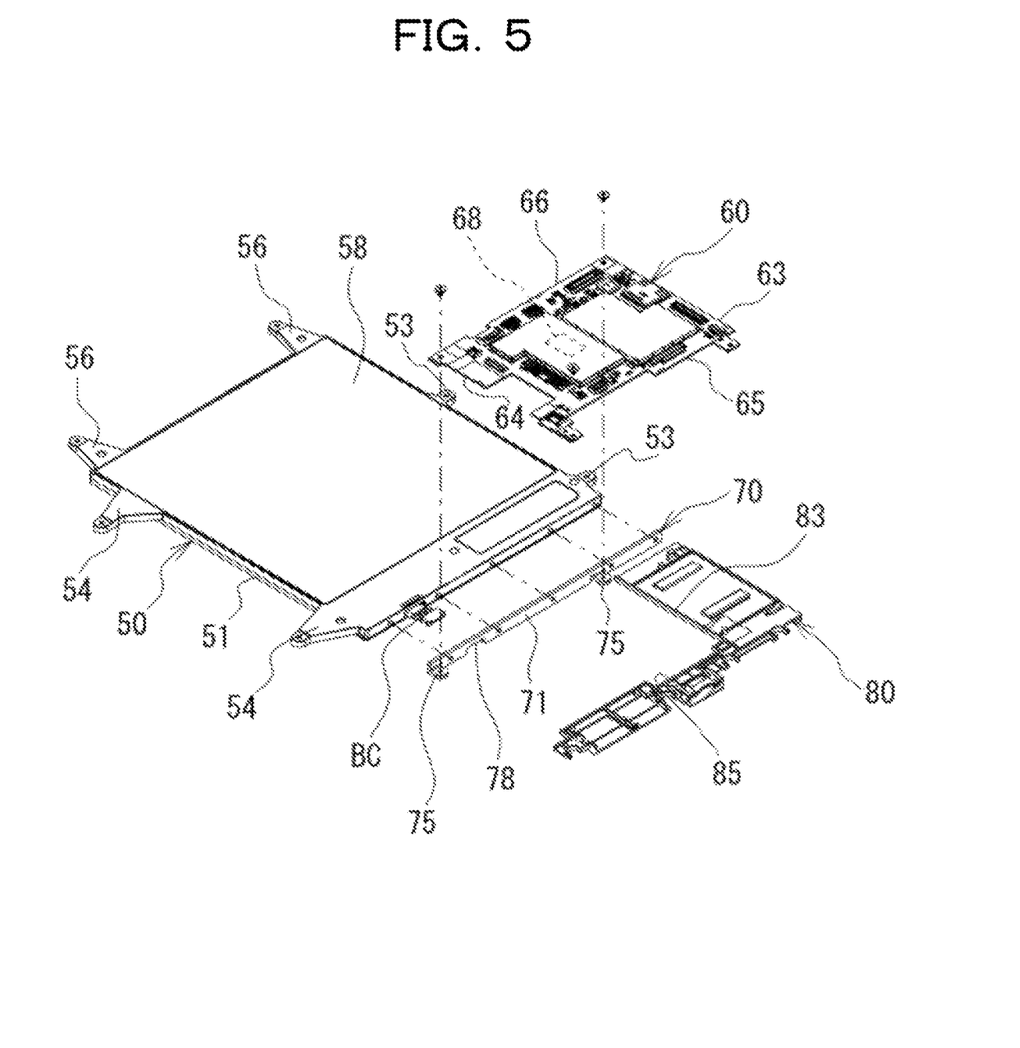
FIG. 5 illustrates an example of a method of fixing a motherboard.

FIG. 5 illustrates an example of a method of fixing a motherboard. The motherboard 60 may be shaped approximately rectangular and includes edges 63 to 66. The electronic component 68 is mounted on a face of the motherboard 60, which does not face the display D. The battery 50 includes a plane with an area that is the largest, such as a face of the sheet 58, and a side face with an area that is smaller than the area of the plane. The fixing plate 70 is fixed to the side face of the frame 51. The fixing plate 70 may be made of metal or synthetic resin. The fixing plate 70 includes a side face part 71 that extends along the side face of the frame 51, and two projecting parts 75 that project outward from the side face part 71. A plurality of projections formed on the side face of the frame 51 fit into holes formed in the fixing plate 70 and the fixing plate 70 is fixed to the frame 51. The side face part 71 is provided with a notch 78 for letting out a cable BC. The notch 78 may be shaped like a hole. The cable BC is a cable that electrically couples the battery 50 and the motherboard 60. The cable BC is electrically coupled to the motherboard 60 via the connector AC.

The motherboard 60 is provided with holes into which screws may be inserted at four respective corners. As illustrated in FIG. 5, both end portions of the edge 66 of the motherboard 60 are supported by the projecting parts 75 and fixed by screws. As illustrated in FIG. 2 or 3, both end portions of the edge 65 of the motherboard 60 are supported using bosses 35B provided on the edge 35 side of the front frame 30 and are fixed by screws.

Part of the motherboard 60 is supported by the fixing plate 70 fixed to the battery 50. For example, when the motherboard 60 is enlarged and supported simply by the front frame 30 without using the fixing plate 70, a large number of bosses may be provided to the front frame 30. Accordingly, an inside area of the front frame 30, which is usable to fix other components, may be reduced. When the large number of bosses are provided inside the front frame 30, positions for arranging the other components may be considered in detail so as not to cause interference with the bosses. The motherboard 60 may be enlarged.

Since the motherboard 60 is partially supported by the fixing plate 70 fixed to the battery 50, the number of bosses formed on the front frame 30 side may be reduced. Accordingly, space to be occupied by the other components may be secured on the front frame 30 side. The degree of freedom for the positions of the other components fixed or arranged inside the front frame 30 may be enhanced. For example, the degree of freedom for the arrangement positions of the antennas AT, the camera unit CU, the connectors PC, UC, and AC, or the earphone jack J arranged near the edge of the front frame 30 may be enhanced. Stable support may be performed without enlarging the motherboard 60. When the fixing plate 70 is made of metal, the motherboard 60 may be supported more stably.

The battery 50 and the motherboard 60 are arranged side by side in a plane direction of the motherboard 60, and the fixing plate 70 is fixed to the side face of the battery 50. Thus, the battery 50 and the motherboard 60 may be thinned, and the entire housing 20 may be thinned as well.

As illustrated in FIG. 5, edges 83 and 85 of the support plate 80 support the rear face of the motherboard 60 near the respective edges 63 and 65, which is for example, the face that faces the display D. Thus, the motherboard 60 may be supported more stably. Since the support plate 80 supports the edges 63 and 65 that are approximately perpendicular to each other, possible bendings in both the longitudinal direction and the lateral direction may be reduced, and possible approaches toward the display D caused by the bendings of the motherboard 60 may be reduced. Thus, possible influences of the heat from the electronic component 68 upon the display D may be reduced. Since the support plate 80 supports the edges 63 and 65 while keeping away from the center of the motherboard 60, heat releasability of the electronic component 68 may be secured.

Since the support plate 80 supports the motherboard 60, the communication card TC, and the connectors UC and AC, the possibility of increasing the number of components may be reduced. It may be undesired that the support plate 80 is fixed directly to the front frame 30 by a screw or the like. The support plate 80 may be supported using a rib or a boss provided on the front frame 30 side, and may be held between the front frame 30 and the motherboard 60 by partially fixing the motherboard 60 on the front frame 30 side. The number of screws may be reduced.

Figure 6:
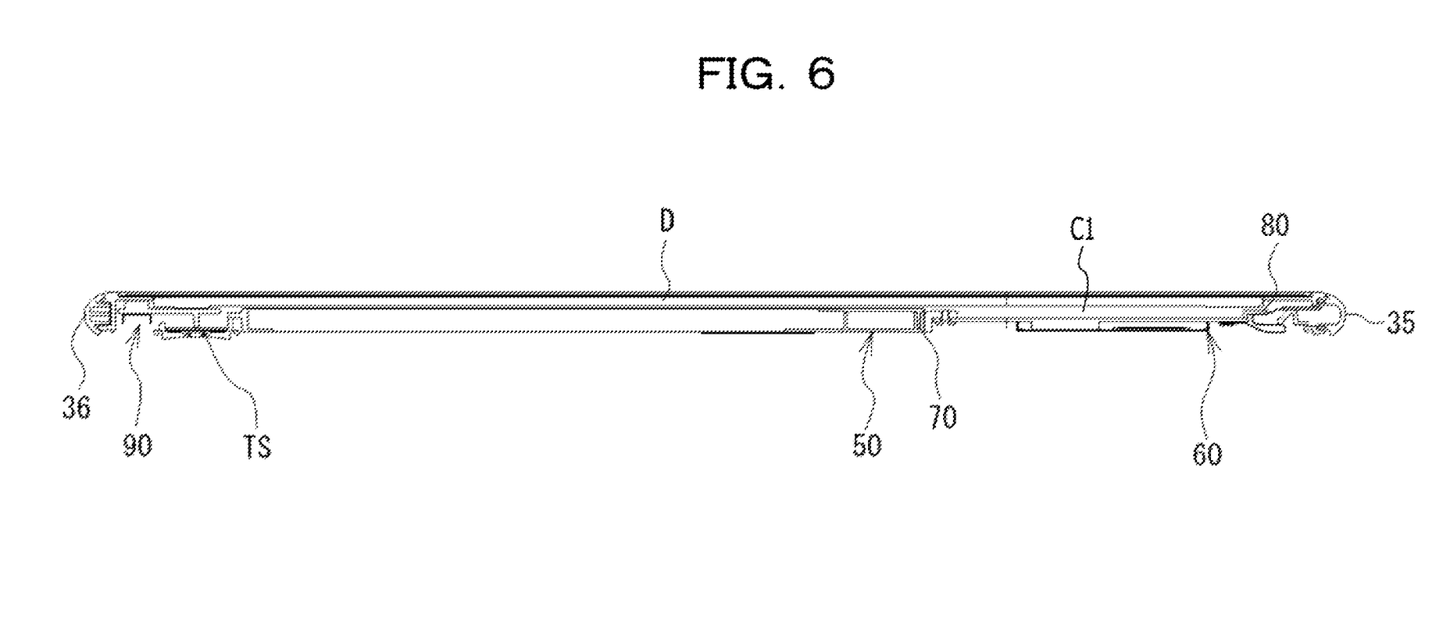
FIG. 6 illustrates an example of a sectional view of a computer.
Figure 7:
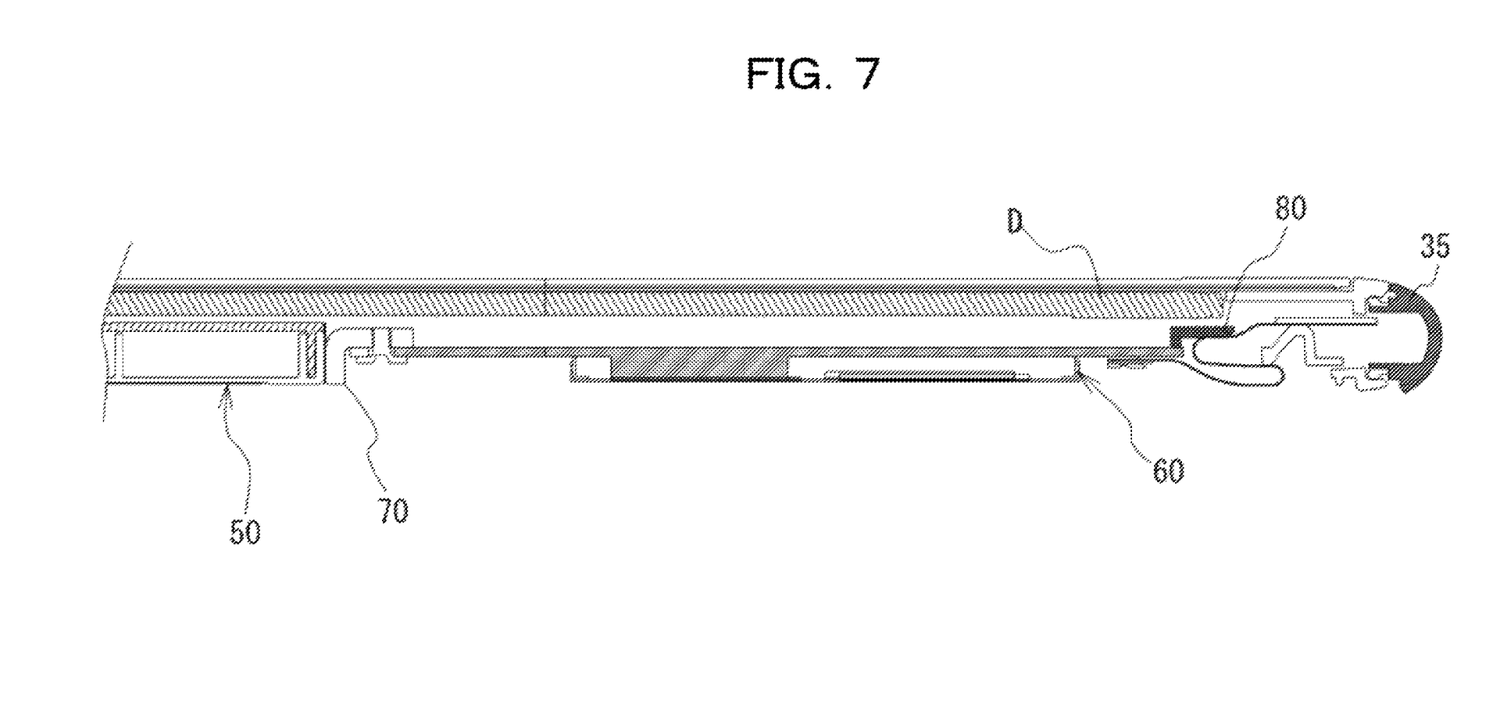
FIG. 7 illustrates an example of a partial enlarged view of a computer.

FIG. 6 illustrates an example of a sectional view of a computer. In FIG. 6, a VI-VI sectional view of FIG. 4 is depicted. FIG. 7 illustrates an example of a partial enlarged view of a computer. In FIG. 7, a partial enlarged view of FIG. 6 is depicted. As illustrated in FIG. 7, the fixing plate 70 and the support plate 80 are supported and fixed with a certain clearance C1 so that the motherboard 60 may not touch the back face of the display D. Thus, possible influences of the heat from the electronic component 68, which is mounted on the motherboard 60, upon the display D may be reduced.

As illustrated in FIG. 2 or 3, a large number of components may be arranged on the front frame 30 side instead of being arranged on the rear panel 40 side. For example, when the components are fixed on both the front frame 30 side and the rear panel 40 side to assemble the housing 20, the components fixed on the front frame 30 side and the components fixed on the rear panel 40 side may be electrically coupled to one another. Accordingly, processes may become complicated. For example, when all of the components are arranged on the front frame 30 side, work performance may be enhanced. For example, on the front frame 30 side, the display D, the antennas AT, the camera unit CU, the connector PC, the earphone jack J, the battery 50, the motherboard 60, the support plates 80 and 90, and the like may be arranged.

For example, when the display D and the motherboard 60 are arranged on the rear panel 40 side, the motherboard 60 may be fixed on the rear panel 40 side first, and after that, the display D may be arranged on the rear panel 40 side. When the display D is arranged on the rear panel 40, since the front face side of the display D is provided with the screen DP, the back face side of the display D may be arranged toward the rear panel 40. Accordingly, for example, since the display D may be arranged toward the rear panel 40 after the flexible printed board TPC extending from the back face side of the display D has been coupled to the motherboard 60, processes may be complicated.

First, the display D may be attached to the front frame 30, and after that, the support plates 80 and 90 may be attached toward the front frame 30, and after that, the battery 50 may be arranged, and lastly, the motherboard 60 may be arranged. Accordingly, electrical coupling of the other components and the motherboard 60 may be performed after all of the components have been arranged on the front frame 30 side. Accordingly, as illustrated in FIG. 4, the flexible printed boards F3, F4, and F6 coupled to the motherboard 60 may be caused to extend between the battery 50 and the rear panel 40. Thus, processes of arranging the plurality of components to the front frame 30 side and processes of electrically coupling the components to one another may be performed separately. As a result, wiring processes may be facilitated and assembling performance may be enhanced. The flexible printed boards F3, F4, and F6 may be cables, flat cables, or the like.

However, a similar computer use a spring contact point on the rear panel, it may be undesired that a spring contact point for electrical coupling with the other components is provided on the rear panel 40 side. In the current embodiment, no spring contact point may be necessary. Thus, when the rear panel 40 is fixed to the front frame 30, possible partial risings of the rear panel 40 from the front frame 30 due to the reaction force of the spring contact point may be reduced. As a result, dustproof and waterproof properties, design, and the like may be secured.

The electronic device may be a straight computer, and the housing of the electronic device may house a battery and a printed board. For example, the electronic device may be a notebook-type computer, a mobile telephone, a portable television, an electronic dictionary, a personal digital assistant (PDA), a game machine, a camera, a music player, a navigation device, a wireless keyboard, a pointing device such as a wireless mouse, or the like. The electronic device may be a standing desktop-type computer, a monitor, a television, an audio device, or another household electrical appliance.

The motherboard 60 that mounts the electronic component 68 is supported by the fixing plate 70. The printed board supported by the fixing plate 70 may be a printed board for a connector or a printed board that mounts a sensor.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that familiar with various changes, substitutions, and alterations could be made hereto without departing from the spirit and scope of the invention.

What is claimed is:

1. An electronic device comprising:
   a battery;
   a fixing member coupled to the battery;
   a printed board partially fixed to the fixing member;
   a housing that houses the battery, the fixing member, and the printed board, the battery being fixed to the housing;
   a display provided on the side opposite to the printed board; and
   a support plate that supports the printed board and is provided so as not to be in contact with a surface of the display,
   the battery is fixed on a first side surface of the fixing member and the printed board is fixed on a second side surface of the fixing member opposite to the first side surface.

2. The electronic device according to claim 1, wherein the printed board includes a heat generating component, and the fixing member holds the printed board at a distance from the display.

3. The electronic device according to claim 2, wherein the housing includes a frame-shaped front cover exposing a screen of the display and includes a rear cover positioned opposite to the front cover, the battery is fixed to the front cover.

4. The electronic device according to claim 3, wherein a first coupling part electrically coupling the printed board to another electronic component, and the first coupling part is positioned between the battery and the rear cover.

5. The electronic device according to claim 3, wherein at least one of an antenna, a camera, a switch, and a connector is arranged inside the frame-shaped front cover.

6. The electronic device according to claim 3, wherein a rigidity of the front cover is higher than a rigidity of the rear cover.

7. The electronic device according to claim 2, wherein the battery and the printed board are arranged side by side in a plane direction of the printed board.

8. The electronic device according to claim 1, wherein the support plate
   secures a space between the display and the printed board.

9. The electronic device according to claim 8, wherein the support plate are secured to at least two edges of the printed board which are perpendicular to each other.

10. The electronic device according to claim 1, wherein the support plate is in contact with a surface of the printed board which faces the display and supports the printed board at an edge of the printed board.

11. The electronic device according to claim 1, wherein the fixing member includes an opening part for a second coupling part configured to electrically coupling the battery to the printed board.

12. The electronic device according to claim 1, wherein the battery includes a planer face, and a side face, and the fixing member is fixed to the side face of the battery.

13. The electronic device according to claim 1, wherein the printed board is partially fixed to the housing.

14. An electronic device comprising:
   a housing, within the housing:
   a battery with a fixing member;
   a support plate;
   a printed board provided between the fixing member and the support plate, the printed board being supported by the fixing member and the support plate; and
   a display provided on the side opposite to the printed board, wherein the battery is fixed on a first side surface of the fixing member and the printed board is fixed a second side surface of the fixing member opposite to the first side surface, wherein the support plate supports the printed board and is provided so as not to be in contact with a surface of the display.

15. The electronic device according to claim 14, wherein the support plate is in contact with a surface of the printed board which faces the display and supports the printed board at an edge of the printed board.

16. The electronic device according to claim 14, wherein the support plate supports at least two edges of the printed board, the at least two edges facing the display.

17. The electronic device according to claim 14, wherein the support plate supports a connector board.

* * * * *